United States Patent [19]

Sandvig et al.

[11] Patent Number: 4,664,832
[45] Date of Patent: May 12, 1987

[54] DEICING CHEMICALS AND THEIR PREPARATION FROM POLYSACCHARIDE SOURCES

[75] Inventors: Robert L. Sandvig; William A. Klemm; Jack R. Gaines; Robert W. Looyenga, all of Rapid City, S. Dak.

[73] Assignee: State of South Dakota as represented by the Department of Transportation, Pierre, S. Dak.

[21] Appl. No.: 655,876

[22] Filed: Sep. 28, 1984

[51] Int. Cl.$^4$ .............................................. C09K 3/18
[52] U.S. Cl. ....................................... 252/70; 162/16
[58] Field of Search ............................ 252/70; 162/16

[56] References Cited

U.S. PATENT DOCUMENTS

| | | | |
|---|---|---|---|
| 2,233,185 | 2/1941 | Smith | 252/76 |
| 2,673,148 | 3/1954 | Harris | 162/65 |
| 2,686,120 | 8/1954 | Marshall et al. | 162/65 |
| 2,750,414 | 6/1955 | Chesley et al. | 260/528 |
| 3,640,768 | 2/1972 | Eickemeyer | 127/37 |
| 3,756,956 | 9/1973 | Panusch | 252/70 |
| 3,764,464 | 10/1973 | Samuelson | 165/65 |
| 3,769,152 | 10/1973 | Samuelson et al. | 162/65 |
| 4,108,669 | 8/1978 | Otrhalek et al. | 252/70 |
| 4,351,669 | 9/1982 | Nielsen | 106/2 |
| 4,374,743 | 2/1983 | Stockel | 252/70 |
| 4,377,488 | 3/1983 | Gancy | 252/70 |
| 4,400,285 | 8/1983 | Gancy | 252/70 |
| 4,430,240 | 2/1984 | Sandvig et al. | 252/70 |
| 4,448,702 | 5/1984 | Kaes | 252/70 |

OTHER PUBLICATIONS

Abstract 132336e (Czech. Pat. No. 148,730), 1973.
Abstract 132337f (Czech. Pat. No. 148,729), 1973.
Abstract 147836s (Jap. Pat. No. 73 05,673), 1973.
Abstract 68269f (Jap. Pat. No. 73 17,482), 1973.
Abstract 168222n (Ger. Pat. No. 2,107,558), 1972.
Abstract 55786u (Czech. Pat. No. 134,189), 1969.
Abstract 132602q (U.S.S.R. Pat. No. 272,462), 1970.
Abstract 59388f (French Pat. No. 1,509,475), 1968.
Abstract 19019a (French Pat. No. 1,401,440), 1965.
Gilbert et al., "Hydrolysis of Wood", Jul. 1952, Industrial and Engineering Chemistry.
Mahood et al., "Reaction Products of Alkali-Sawdust Fusion Acetic, Formic, and Oxalic Acids and Methyl Alcohol" Journal of Ind. Eng. Chem., vol. 11, No. 7, 7/1979.
Melander, "Ligninundersokningar" 1921.
Othmer et al., "Oxalic Acid from Sawdust" Ind Eng Chem, Mar. 1942.
Minor et al., "Oxygen Pulping of Shortleaf Pine with Sodium Carbonate" Tappi vol. 58, No. 3, Mar. 1975.
Jamieson et al., "Oxygen-sodium Bicarbonate Pulping of White Birch" Tappi vol. 58, No. 2, Feb. 1975.
Marton et al., "Oxygen Pulping of Thermomechanical Fiber" Tappi vol. 58, No. 2, Feb. 1975.
Hata et al., "Oxygen-alkali Semichemical, Pulping of Wood Chips" Tappi vol. 58, No. 2, Feb. 1975.
Sarkanen et al., "Use of Oxygen in Pulping" AICHE Symposium Series, vol. 72, No. 157 (1976).
Bjorksten Research Laboratories, Inc., "Unsolicited Proposal Deicing Chemicals from Cellulosic Waste" P-3050-1.
National Cooperative Highway Research Program Report No. 19, 1965.
Federally Coordinated Program of Highway Research and Development Report.
Othmer et al., "Continuous Fusion Process" Ind Eng Chem, Mar. 1942.

*Primary Examiner*—S. Leon Bashore
*Assistant Examiner*—K. M. Hastings
*Attorney, Agent, or Firm*—Merchant, Gould, Smith, Edell, Welter & Schmidt

[57] ABSTRACT

Deicing chemicals intended primarily for decing pavement such as roads, bridges, and runways are prepared from polysaccharide sources (e.g., waste products such as sawdust) by reaction at a pressure of less than 600 psi and a temperature less than 200° C. with a treating agent comprising alkali metal carbonates or bicarbonates or a mixture thereof and excess oxygen in the presence of water followed by the removal of oxalate and the treating agent. The reaction produces a liquid or a liquid/solid reaction product wherein the liquid contains the deicing chemical and the solid comprises a valuable pulp by-product. Calcium oxide or calcium hydroxide may be added to reduce the pressure resulting from the formation of large amounts of carbon dioxide during the reaction process and to aid in the removal of any oxalic acid formed during the reaction process. The deicing chemicals are impure mixtures of alkali metal salts of lower carboxylic acids substantially free of the alkali metal salt of oxalic acid, carbonic acid and of other organic compounds. The deicing chemicals are intended to be a substitute for the inorganic chloride salts (e.g, sodium chloride) commonly used for deicing highways.

9 Claims, No Drawings

DEICING CHEMICALS AND THEIR PREPARATION FROM POLYSACCHARIDE SOURCES

FIELD OF THE INVENTION

The invention relates to the manufacture of a high quality pulp that can be used in paper manufacture and as a dissolving pulp; and to the manufacture of deicing chemicals intended primarily for deicing pavement such as roads, bridges, and runways. The chemical conversion of the hemicellulose and possibly lignin in polysaccharide materials results in the deicer composition and the conversion of the cellulosic material results in the pulp.

BACKGROUND OF THE INVENTION

Deicers

The presence of ice and snow on pavement such as roads, sidewalks, bridges, runways, and the like presents safety hazards and operational obstacles to many everyday activities such as driving, flying, etc. Over the years, a variety of techniques have been used in the colder parts of the world to remove or destroy ice and snow. The techniques utilized have ranged from simple mechanical approaches (e.g., shoveling or plowing) to heating (e.g., by means of buried heating elements or by the direct application of heat) to chemical methods (e.g., the use of deicers such as sodium chloride and calcium chloride in solid or solution form). Where large surface areas and large accumulations of ice and snow are involved, such as roadways and runways, a combination of mechanical (e.g., snowplowing) and chemical methods (e.g., salt mixed with sand) are commonly used.

The most commonly used chemical deicer for highways is sodium chloride in the form of rock salt. Sodium chloride is used since it is relatively inexpensive, readily available in large quantities, and weight efficient as a deicer. At the present time it is estimated that the U.S.A. alone uses about 9 to 10 million tons of salt each year for deicing purposes. It is generally agreed that calcium chloride is the most effective chemical now used as a bulk deicer on a weight for weight basis. However calcium chloride is a relatively expensive chemical commodity and, like sodium chloride, is a source of chloride ion, an active corrosion agent.

In recent years, increasing attention has been focused on the total economic impact of the use of sodium chloride (i.e., rock salt) or calcium chloride or mixtures thereof as a highway deicing chemical and it has been discovered that while the initial cost of sodium chloride or calcium chloride is relatively low, the total cost can be enormous. Consideration must be given to the corrosive damage to vehicles and pavement, the corrosive damage to metal structures such as bridge elements and highway reinforcing bars, and environmental damage to soil, water, plants and animals. By way of illustration, the U.S. Environmental Protection Agency published data in 1976 suggesting that the conservative cost of the damage resulting from the use of sodium chloride-rock salt for highway deicing is approximately fifteen times the direct cost of purchasing and applying the salt in the first instance. Against this background, the State of South Dakota has already limited future use of sodium chloride salt for highway deicing purposes; and other political bodies may take similar actions in the future.

With these economic incentives, new research interest has been directed toward the idea of developing alternative deicing chemicals that would have a total cost (e.g., on a state-wide basis) which would be significantly less than the total cost associated with the use of sodium chloride or calcium chloride as a highway deicer. However, if the highway community is to be provided with an effective, non-corrosive, environmentally acceptable chemical deicer, it is necessary to develop commercially attractive production methods. Processes must be found that can be operated economically, producing the deicing product at an acceptable cost. To reduce transportation costs, it would be desirable to manufacture the deicing product in the geographic area where the deicing chemical is to be used and to produce the chemical from biomass materials found in the area.

Against this background, there has been renewed interest in the possible use of a generally equimolar mixture of calcium and magnesium acetates, commonly referred to as "CMA", which has shown considerable promise as a deicing chemical. Limited field tests have confirmed its ability to function as a deicer. Moreover, CMA does not contain the chloride ion present in sodium chloride, which is apparently responsible for many corrosive side effects. However, CMA is expensive to manufacture if it is prepared by classical chemical methods using relatively pure chemicals. Consequently, some suggestions have been made that a less pure form of acetic acid might be used in an effort to reduce the cost of making CMA and some consideration has been given to the possibility of producing CMA by a process in which a crude form of acetic acid is made by reacting cellulose with an inorganic base at atmospheric pressure. For example, it is known that acetic acid can be made by fusing sodium hydroxide with cellulosic materials to provide yields of acetic acid of about 15 percent. However, it has been noted that the production of large amounts of acetic acid by this route is accompanied by the production of significant amounts of oxalic acid.

Pulp Manufacture

Lignocellulosic biomass is the raw material for the manufacture of pulp used in paper making. The major components of useful biomass are lignin, hemicellulose and cellulose. Cellulose is a well known, well characterized, high molecular weight polymer that commonly consists mainly of glucose units which are linked by bonds substantially resistant to the action of enzymes that can hydrolyze starch. Lignin is a complex resinous material containing phenol groups, methylene groups, ether groups, and others. Lignin commonly is considered to act as an adhesive which holds the cells and cellulosic components of cells together in growing plants. Hemicellulose has a fairly definite composition, depending upon its source, and generally comprises short chain length molecules, as compared to cellulose, that are generally easily hydrolyzed in hot dilute mineral acid and are soluble in cold, 5% aqueous sodium hydroxide. Hydrolysis of hemicellulose commonly yields a mixture of d-xylose, d-mannose, d-glucose, and to a much smaller extent, 1-arabinose, d-galactose, and 1-rhaminose.

A number of processes have been developed for producing useful pulp. These processes involve the disruption of the cellulosic plant material into cellulose fibers, the removal of lignin and other undesirable components, and the bleaching of the raw pulp resulting in a light colored product. In order to produce high quality paper stock, pulp is often chemically bleached to an extent that the paper has a G.E. brightness of at least 80%. The raw pulp from commercial paper making processes can result in paper having a G.E. brightness of about 30% and somewhat greater, and pulp after repeated bleaching can produce paper having a G.E. brightness of 80% to 90% and more. Commercial pulp making processes involve the use of a variety of bleaching chemicals such as chlorine, chlorine dioxide and hypochlorite, which can result in substantial operative and environmental hazards.

Under the circumstances, there exists a continuing need to develop new effective chemical deicers and low cost, practical, alternative methods for the manufacture of the chemical deicers which will have significantly reduced environmental consequences and which produce useful by-products, e.g. a cellulosic pulp.

SUMMARY OF THE INVENTION

The invention is based upon the observation and discovery that the polysaccharide components (e.g., cellulose) from various sources, including many solid wastes, can be chemically converted using an alkali metal bicarbonate or carbonate into a crude reaction product that contains a pulp that can be used as a dissolving pulp or in the manufacture of paper, and a variety of useful, identifiable chemicals that have deicing properties.

The crude reaction product comprises a liquid and solid phase. The liquid phase comprises the alkali metal salts of organic acids including glycolic acid, formic acid, acetic acid, maleic acid and oxalic acid (formed in small amounts under certain reaction conditions); present in smaller amounts are alkali metal salts of other acids such as lactic acid, fumaric acid, malic acid, malonic acid, tartaric acid. With the substantial removal of the alkali metal carbonate or bicarbonate and with the removal of oxalic acid, e.g. as an insoluble calcium salt, this mixture of salts is an effective substitute for sodium chloride or as a codeicer, with sodium chloride and other substances, that can be used in the deicing of pavement. We have found that, while the alkali metal bicarbonate or carbonate is an effective reagent in the formation of a deicer and in the formation of pulp, its presence in the deicer phase reduces the deicing properties of the deicer. The deicer invention substantially free of alkali metal bicarbonate and carbonate can significantly reduce many of the adverse economic consequences of using sodium chloride salt for highway deicing purposes. In fact, corrosion studies on the crude reaction product (e.g., primarily the sodium salts of formic acid, acetic acid, glycolic acids, and lactic acid) indicate a definite corrosion inhibiting action of this product on metal structures such as bridge elements and highway reinforcing bars.

Much early work has been done regarding production of acids from purified cellulose by the action of base in order to elucidate the similarity of cellulosic plant material to coal, which is believed to be largely derived from plants. However to the best of our knowledge the deicing properties of the solid component in the liquid portion of the reaction product formed from the component comprising a hemicellulosic material in the raw source of cellulosic materials and the potential of producing a valuable pulp by-product have never been recognized.

The solid phase which can be produced under certain reaction conditions can consist of a high quality cellulosic pulp requiring little or no bleaching to produce paper having a G.E. brightness of 80% to 90%.

Briefly described, the process of the present invention includes the following steps:

(a) obtaining a crude source of a lignocellulosic biomass material, typically as the polysaccharide component of solid residues or wastes (e.g., sawdust, waste paper, sunflower stalk, etc.);

(b) forming a mixture of the polysaccharide material, water and an effective amount of an alkali metal carbonate or bicarbonate or mixtures thereof and an optional oxalic acid precipitating compound;

(c) contacting the mixture with an enriched oxygen containing gas such as oxygen, or oxygen enriched air at a suitable ratio of oxygen to biomass and reacting the mixture with suitable agitation at a sufficient reaction promoting temperature and pressure depending on the desired mix of liquid/solid reaction products;

(d) reducing the temperature of the reaction mixture to less than the reaction temperature at an appropriate time depending on the desired mix of liquid/solid reaction products;

(e) removing any gaseous phase;

(f) separating the reaction mixture into a liquid deicer containing phase and a solid cellulosic-pulp phase;

(g) substantially removing oxalic acid and alkali metal carbonate or bicarbonate from the liquid phase, if present; and (h) recovering from the liquid phase a mixture of chemicals including the alkali salts of formic acid, acetic acid, glycolic acid, lactic acid, maleic acid, fumaric acid, malic acid, malonic acid and tartaric acid with the mixture being substantially free of the alkali metal salt of carbonic acid and oxalic acid and of other organic compounds.

In the process the cellulose is left as a high quality pulp, the hemicellulose is converted to deicer and the lignin becomes substantially carbon dioxide and water. The mixed chemicals substantially free of alkali metal oxalate, carbonate and bicarbonate recovered in step (h) of the process described above may be recovered and used in the form of an aqueous solution or the water may be removed to form a concentrate or a solid mixture of the salts. Either the liquid, the concentrate or the solid material can be used as a deicer without further modification. Further, these materials can be used alone or can be mixed with other deicers or aggregates such as rock salt, cinders, gravel or sand in proportions of about 0.01 to 100 parts of the deicer per each part by weight of the other deicer or aggregate.

DETAILED DISCUSSION

General Process Considerations

The reaction of cellulosic materials (e.g., sawdust) with bases such as sodium hydroxide or lime is described in the literature; see, for example, U.S. Pat. No. 2,750,414. Nielson, U.S. Pat. No. 4,351,669 teaches extracting surface wax from cellulosic material leaving an extracted non-reacted product. Gancy, U.S. Pat. No. 4,377,488 teaches a CMA-type product but fails to teach a reaction product of an alkali base and a cellulosic material. To our knowledge, such processes have tended to focus on the production of various acids (e.g., oxalic acid) which can be made in this manner, and the general process has been manipulated to favor the production of one acid or another. In evaluating this general process as one of a number of possible sources of acetic acid for use in making CMA, it was unexpectedly discovered that the process could be run in a continuous or batch mode and can be manipulated in such a way as to prepare both an effective chemical deicer, using the one step reaction process, and a valuable pulp in proportions depending on reaction conditions.

For purposes of balancing the production of pulp and the chemical deicer, it has been discovered that:
(a) lignocellulosic biomass raw material sources such as agricultural waste and forest industry by-products including sawdust, crop residue, etc. can be used as the starting material;
(b) the presence of about 5 to 25 parts, preferably 5 to 12 parts of water per part of raw material is required in the reaction zone;
(c) an alkali carbonate or bicarbonate or mixtures thereof in a proportion of about 0.3 to 3 equivalents of carbonate or bicarbonate per 100 grams of raw material, in combination with an optional oxalic acid precipitating compound, is used;
(d) the reaction zone is operated under moderate superatmospheric pressure, i.e. less than 600 psi, preferably less than 400 psi;
(e) the reaction zone has an enriched oxidizing atmosphere at a ratio of about 0.5 to 4 gm.-mole of oxygen per 100 gms. of biomass, preferably about 1.8 to 2.2 gm.-mole of biomass;
(f) the reaction zone is maintained with suitable agitation below about 200° C., preferably about 120°-170° C.;
(g) the solid phase, which can contain a valuable pulp, of the resulting crude reaction product can be easily separated from the desired liquid reaction product containing the deicing chemical.

The water soluble portion rich in alkali metal salts of lower carboxylic acids such as formic, acetic, glycolic, lactic and others is treated to remove oxalate, carbonate and bicarbonate. This fraction is unique in that it is substantially free of the alkali metal salt of oxalic acid and other organic compounds, and can act as a non-corrosive deicer.

The reaction conditions of the above-described general process can be modified in order to optimize the production of either the deicer component or the production of useful paper pulp in combination with useful quantities of the deicer. Under conditions of temperature in excess of 200° and pressure in excess of 600 psi, the process tends to consume both cellulose and hemicelluose and produce the deicer composition to the exclusion of useful pulp; however, the reaction conditions can be altered to produce an economically beneficial amount of useful pulp. The cellulose pulp by-product is separated from the liquid reaction product phase by any common separation technique including filtration, centrifugation, decantation, etc. We have found that the pulp produced from the adjusted process is of high quality. The pulp is white, finely divided, easily slurried, can be combined with paper making additives and can readily form sheets.

Polysaccharide Raw Materials

Suitable lignocellulosic biomass raw materials can include any waste materials that are rich in polysaccharides. Examples of such waste materials include wood particles (e.g., sawdust and wood chips), straw, corn stalks, waste paper, sunflower stalks and the like. Because of the ready availability and general ease of chemical conversion of wood and wood products, wood particles (e.g. sawdust) are preferred as a raw material for use in the present invention. The preferred raw material is wood residue, e.g. pine or aspen. If desired, mixtures of raw materials may be used. In each instance, process conditions can be optimized to reflect the nature and quality and form of the particular raw material being used.

If the raw material is not already in the form of small particles (e.g., sawdust) the raw material should be reduced in size to facilitate rapid chemical reaction and handling ease. Size is important, but not critical. Small particles are preferred for reasons of ease of conversion to deicer and useful pulp.

Pre-Treatment

A pre-treatment soaking in acidic, basic, or neutral media can be useful to begin the disruption of the cellulosic plant structures.

Treating Agents

The treating agents used in the chemical reaction that converts the polysaccharide raw materials to deicer and pulp can be an alkali metal carbonate, alkali metal bicarbonate or mixtures thereof. One agent is Trona which is a mineral that comprises an approximately equimolar mixture of sodium carbonate and sodium bicarbonate, and two moles of water of crystallization. The treating agent can also include an oxalic acid precipitating compound such as an alkaline earth metal base. An example of a precipitating compound is a calcium base. The amount of the alkali metal base treating agent used can vary, but will generally be from 50 to 150 percent of the stoichiometric amount of treating agent required to convert all of the cellulose in the polysaccharide waste into sodium acetate, assuming hypothetically that all of the cellulose is converted into acetic acid. Amounts of treating agent which are about equal to the stoichiometric amount, about 10 percent more or less of the stoichiometric amount, are preferred. With the treating agent, an enriched source of oxygen is essential to the process in that it eliminates nearly all other organic matter from the liquid phase of the reaction process. The concentration of oxygen in the gas phase should be at least 30 volume-%, preferably at least 50 volume-%, and most preferably at least 80 volume-%. The amount of oxygen, air or oxygen enriched air used can vary, but will generally be up to about 6.0 gm.-moles of oxygen per 100 g. of polysaccharide raw material. Preferably, a small amount of oxygen should remain in the reaction gases after the reaction is complete.

Initiating the Reaction

The polysaccharide raw material, the alkali metal carbonate, bicarbonate or mixtures thereof and sufficient water to provide an easily manageable slurry (e.g., 5–50 percent solids, preferably 10–25 percent solids) can be introduced into a suitable reaction zone (e.g. an autoclave or continuous tube reactor). The temperature of the system can be raised to a reaction initiating temperature which is typically above about 100° C., preferably within the range of about 120°-150° C. Typically, the time required to reach the reaction temperature will be about 20-180 minutes, e.g. about 30-90 minutes. After the reaction has been started, the temperature will typically be allowed to rise to a level within the range of about 130°-200° C., usually within the range of 130°-170° C. Higher temperature can reduce the pulp yield.

Conducting the Reaction

The reaction time (following attainment of reaction temperature) in batch mode will usually range from 10 to 120 minutes, or 10 to 120 minutes residence time in continuous mode.

It is important that the reaction zone operate under superatmospheric pressure in a sealed or closed system with suitable agitation. If the system is totally closed, the auto-generated pressure should be typically controlled to a point within the range of 10–400 psig (e.g., 100–350 psig). If desired the system can be treated with calcium oxide or calcium hydroxide which lowers the pressure by removing carbon dioxide, a by-product formed during the reaction process.

The reaction conditions can be adjusted to favor the production of the deicer component or can be adjusted to favor the production of pulp in combination with the deicer composition.

When it is desired to terminate the reaction, the reaction mixture can be cooled preferably by venting the reactor to the atmosphere or by quenching the reaction.

Separating the Reaction Mixture

The reaction mixture is next separated into a liquid phase and a solid phase by filtration, centrifugation, decantation or other continuous or batch separation steps. This step is important in the instance that the valuable pulp by-product is isolated and in the instance that an oxalic acid precipitating compound, such as calcium oxide or calcium hydroxide, is used with the treating agents since a solid salt of oxalic acid is generated and since calcium carbonate is formed from $CO_2$ generated in the reaction.

We have found that the alkali metal carbonate, the alkali metal bicarbonate or mixtures thereof used as a reaction catalyst in producing the deicer and pulp of this invention can be an effective catalyst but can reduce the deicing activity of the deicer. The carbonate, bicarbonate or mixtures thereof preferably are removed from the liquid phase either before or after further processing into a composition which can be directly applied to road or other surfaces for deicing purposes. Alkali metal carbonate or bicarbonate can be removed from the liquid phase by precipitating agents such as methanol, ethanol, isopropanol, or others. The calcium deicer composition of U.S. Pat. No. 4,430,240, which is hereby incorporated by reference herein, can be added to the liquid phase product and can act as a carbonate or bicarbonate precipitating agent. Once precipitation of the carbonate fraction has begun, the carbonate fraction separates itself substantially from the liquid phase. Alternatively, calcium chloride can be added to the liquid phase, resulting in the formation of sodium chloride and the precipitation of calcium carbonate. Further, the sodium carbonate can be removed by solvent extraction, liquid extraction, or through the use of ion exchange resins.

The solids-free liquid phase, substantially free of oxalate and carbonate or bicarbonate contains the desired chemical for the use as a deicer may be further refined (i.e., concentrated) by, for example, evaporation or reverse osmosis to form a solid or a liquid concentrate. The concentrate can be sprayed on iced surfaces, and solid material can be used for deicing purposes much in the same manner as sodium chloride salt. The concentrated product or the solid product can be mixed with sodium chloride in order to introduce new or improved deicing properties.

The present invention will be further understood by reference to the following specific Examples that include a preferred embodiment. Unless otherwise indicated, all parts and percentages are by weight.

Example I 150 g. of sawdust (oven dried and a maximum particle size of less than 5 mm) was placed in a 2 gallon stirred pressure reaction vessel equipped with a jacket heater, thermostat, pressure relief valve and pressure gauge. Eighty-seven grams (1.62 gm.-equivalents) of anhydrous sodium carbonate and 300 ml. of water were added to the pressure reaction apparatus, which was sealed and pressurized to 200 psig with oxygen (2.85 gm.-moles).

The reaction apparatus was agitated and heated to a temperature of 150° C. (241° F.) (a maximum pressure of 320 psig) over a period of 180 minutes. The reaction apparatus was allowed to cool to less than 100° C. (212° F.) and the gas by-products ($N_2$, $CO_2$, and $O_2$) were vented to the atmosphere prior to opening the reaction vessel.

The reaction product was poured from the reaction apparatus into a 4 liter beaker. The reaction product was filtered with a Buchner funnel to separate pulp from the liquid phase. The filtrate or liquid phase contained sodium carbonate and a mixture of the sodium salts of lower carboxylic acids, predominantly formic acid, acetic acid, glycolic acid, and lactic acid. The yield of the sodium salts was about 34 percent based on the dry weight of the sawdust. The yield of oven dry pulp was 57% based on dry weight of sawdust.

The resulting solution containing predominantly the sodium salts of formic acid, acetic acid, glycolic acid, lactic acid, and residual sodium carbonate was evaporated under reduced pressure. Most of the sodium carbonate and sodium oxalate was removed. The resulting concentrated solution can be used as an effective deicer or dried to yield a solid. The solid was effective as a deicer when sprinkled on ice at a temperatures of 15° F. ($-9.4°$ C.).

TABLE I

| | Deicer Product Composition | | |
|---|---|---|---|
| | Reaction | Solid Deicer Product | |
| Deicer Components | Product % Yield* | Yield** (gms.) | % Composition |
| Sodium glycolate | 7.20 | 10.80 | 33.1 |
| Sodium formate | 6.90 | 10.40 | 31.8 |
| Sodium lactate | 0.10 | 0.15 | 0.5 |
| Sodium acetate | 5.70 | 8.60 | 26.3 |
| Sodium maleate | 1.40 | 2.10 | 6.4 |
| Sodium fumarate | 0.30 | 0.45 | 1.4 |
| Sodium malate | 0.07 | 0.10 | 0.3 |
| Sodium malonate | 0.06 | 0.09 | 0.3 |
| Sodium tartrate | 0.01 | 0.01 | trace |
| Sodium oxalate | 4.20 | | |
| Total | 25.9 | 32.7 | 100.1 |

*Based on grams of wood used
**Based on 150 gms of dry wood used

Table I shows the typical product of the process prior to removal of sodium oxalate and carbonate.

TABLE II

| | Physical Properties of Experimental Pulps | | | | | | | |
|---|---|---|---|---|---|---|---|---|
| | Aspen | | Ponderosa Pine | | Birch | | Ponderosa Pine | |
| Beating Revolutions | 0 | 500 | 0 | 500 | 0 | 500 | 0 | 500 |
| Canadian standard freeness, ml | 495 | 360 | 555 | 290 | 530 | 365 | 640 | 510 |
| Basis wt. g/m$^2$ | 60.9 | 63.5 | 59.9 | 61.0 | 58.3 | 61.8 | 48.3 | 46.9 |
| Thickness, m | 118 | 100 | 108 | 87.4 | 99.6 | 89.9 | 115 | 96.2 |
| Density, g/cc | 0.516 | 0.634 | 0.559 | 0.699 | 0.585 | 0.688 | 0.530 | 0.638 |
| Moisture, % | 7.8 | 7.8 | 7.79 | 7.80 | 8.0 | 8.0 | 8.57 | 8.59 |
| Burst index, KPam$^2$/g | 1.40 | 2.51 | 1.62 | 2.21 | 1.77 | 2.79 | 1.61 | 2.55 |
| Burst factor | 14.3 | 25.9 | 16.5 | 22.6 | 18.1 | 28.4 | 16.4 | 26.0 |
| Tear index, MNm$^2$/g | 3.48 | 3.27 | 3.47 | 2.70 | 3.84 | 2.98 | 4.39 | 3.96 |
| Tear factor | 35.5 | 33.4 | 35.4 | 27.5 | 39.1 | 30.4 | 44.7 | 40.4 |
| Breaking length, km | 3.10 | 5.18 | 2.94 | 3.95 | 3.72 | 5.28 | 4.17 | 5.67 |
| Stretch, % | 1.02 | 1.65 | 1.49 | 1.52 | 1.58 | 1.68 | 1.20 | 1.54 |
| TEA, kg m/m$^2$ | 1.37 | 3.73 | 1.96 | 2.57 | 2.50 | 3.90 | 1.93 | 3.47 |
| MIT double fold | 2 | 11 | 3 | 8 | 4 | 19 | 7 | 24 |
| Z-span breaking length, km | 10.7 | 12.5 | 7.62 | 9.22 | 9.78 | 11.0 | 12.0 | 12.6 |
| Opacity (TAPPI) | 93.8 | 91.3 | 83.4 | 80.1 | 83.1 | 80.4 | 82.0 | 77.1 |
| Specific light scattering | 585 | 466 | 463 | 385 | 484 | 400 | 329 | 266 |
| Brightness, % GE | 56.9 | — | 71.1 | — | 78.1 | — | 44.9 | — |
| 0.5% CED Viscosity | 4.2 | — | 2.56 | — | 2.93 | — | 5.3 | — |

TABLE III

| | Chemical Analysis of Pulp | | | |
|---|---|---|---|---|
| Test | Aspen | Ground Ponderosa Pine | Birch | Shavings Ponderosa Pine |
| KMnO4 No (25 ml) | 1.9 | 1.25 | 1.1 | 8.9 |
| Carbohydrates, % | | | | |
| Araban | 0.4 | 0.1 | 0.8 | 0.7 |
| Xylan | 16.4 | 4.4 | 17.4 | 4.6 |
| Mannan | 1.2 | 7.2 | 1.3 | 11.6 |
| Galactan | 0.8 | 1.4 | 0.6 | 1.4 |
| Glucan | 73.4 | 82.9 | 70.6 | 76.3 |
| Lignin, % | 1.1 | 0.3 | 0.5 | 4.2 |

An examination of the Tables shows a description of the deicer composition in Table I, the physical properties of pulp products in Table II, and an analysis of the pulp in Table III. Table I shows that the process of the invention produces the deicer components at sufficient yield to produce the deicer at commercially significant quantities.

Table II shows that the pulp products of the invention, from a number of sources, are of high quality. The pulp products are high in brightness, strong and sufficiently opaque prior to any subsequent bleaching. Clearly the products of the invention are superior pulps.

Table III shows that the pulp has a high quality carbohydrate composition free of substantial quantities of lignin. The concentration of lignin in the pulp indicates that the pulp when manufactured in commercial quantities can be used as a dissolving pulp.

We claim:

1. A deicer product of a process of producing a cellulosic pulp and a deicing composition, containing in part a mixture of alkali metal salts of lower carboxylic acids, which consists essentially of:

(a) reacting a lignocellulosic biomass raw material with a treating agent comprising an alkali metal carbonate, bicarbonate or mixtures thereof at a ratio of 0.3 to 3 equivalents of the treating agent per 100 grams of raw materials under enriched oxygen conditions, 0.5 to 4.0 gram-moles of oxygen per each 100 grams of biomass, at a temperature of less than about 200° C., at a pressure less than about 600 p.s.i.g., and with suitable agitation producing a crude liquid/solid reaction product;

(b) separating the reaction product into a liquid phase and a cellulosic phase;

(c) separating from the liquid phase a substantial proportion of both the carbonate or bicarbonate treating agent and the oxylate; and (d) thereby obtaining from the liquid phase a deicer product which consists essentially of a mixture, substantially free of an alkali metal salt of oxalic acid and carbonic acid, of alkali metal salts of lower carboxylic acids including salts of glycolic acid, formic acid, acetic acid, maleic acid and at least a trace of alkali metal salts of lactic acid, fumeric acid, malic acid, malonic acid and tartaric acid.

2. A deicing composition which comprises a mixture of rock salt and about 0.01 to 100 parts by weight of the deicing composition product of claim 1 per each part by weight of rock salt.

3. A deicer composition which comprises a mixture of a particulate and about 0.01 to 100 parts by weight of the deicing composition product of claim 1 per each part by weight of the particular comprising sand, gravel, cinders or mixtures thereof.

4. The deicer of claim 3 wherein the deicer additionally comprises about 0.01 to 100 parts of rock salt per part of the particulate.

5. The deicer of claim 3 wherein the deicer additionally comprises about 0.01 to 100 parts of calcium chloride per part of the particulate.

6. A method of deicing surfaces which comprises contacting a surface bearing snow or ice with a deicing chemical consisting essentially of a mixture of alkali metal salts of lower carboxylic acids including formic acid, acetic acid, glycolic acid, maleic acid and at least a trace of alkali metal salts of fumaric acid, malic acid, malonic acid, tartaric acid, and lactic acid wherein the deicing chemical is substantially free of an alkali metal salt of oxalic acid and carbonic acid.

7. The method of claim 6 wherein the deicing chemical is in the form of a concentrated aqueous solution of the alkali metal salts of lower carboxylic acids.

8. The method of claim 6 wherein the deicing chemical is in the form of a liquid containing rock salt and on a dry basis, about 0.01 to 100 parts by weight of the alkali metal salts of lower carboxylic acids per each part by weight of rock salt.

9. A product of a process of producing a mixture of alkali metal salts of lower carboxylic acid useful as a deicing composition which consists essentially of the product of the steps:
- (a) presoaking a lignocellulosic raw material in an acidic, basic, or neutral pretreatment forming a pretreated lignocellulosic material;
- (b) mixing the pretreated lignocellulosic material with an oxalic acid precipitating compound and a treating agent comprising an alkali metal carbonate, alkali metal bicarbonate or mixtures thereof;
- (c) reacting the pretreated cellulosic material and the treating agent at a ratio of 0.3 to 3 parts of treating agent per 100 grams of raw material in oxygen enriched conditions, 0.5 to 4 gram-moles of oxygen per each 100 grams of lignocellulosic biomass at a pressure of less than 400 p.s.i.g. at a temperature of less than 200° C. in a closed system with suitable agitation to form a mixed liquid solid reaction product;
- (d) reducing the temperature of the reaction product after reaction is complete;
- (e) removing volatile gaseous by-products from the reaction mixture;
- (f) separating the reaction mixture into a liquid phase and a solid cellulosic phase;
- (g) removing the treating agent; and
- (h) thereby obtaining from the liquid phase a deicer product which consists essentially of a mixture of alkali metal salts of lower carboxylic acids including glycolic acid, formic acid, acetic acid, maleic acid and at least a trace of alkali metal salts of lactic acid, malic acid, malonic acid, and tartaric acid, and substantially free of an alkali metal salts of oxalic acid and carbonic acid.

* * * * *

UNITED STATES PATENT AND TRADEMARK OFFICE
CERTIFICATE OF CORRECTION

PATENT NO. : 4,664,832

DATED : May 12, 1987

INVENTOR(S) : ROBERT L. SANDVIG et al

It is certified that error appears in the above-identified patent and that said Letters Patent is hereby corrected as shown below:

```
In the Abstract, line 1, for "decing" read --deicing--.
Column 8, line 47, for "temperatures" read
   --temperature--.
Column 10, line 45, for "deicing" read --deicer--.
Column 10, line 52, for "particular" read --particulate--.
Column 10, line 57, for "3" read --4--.
Column 12, line 20, for "salts" read --salt--.
```

Signed and Sealed this

Twenty-first Day of June, 1988

Attest:

DONALD J. QUIGG

*Attesting Officer*  *Commissioner of Patents and Trademarks*